Patented May 22, 1945

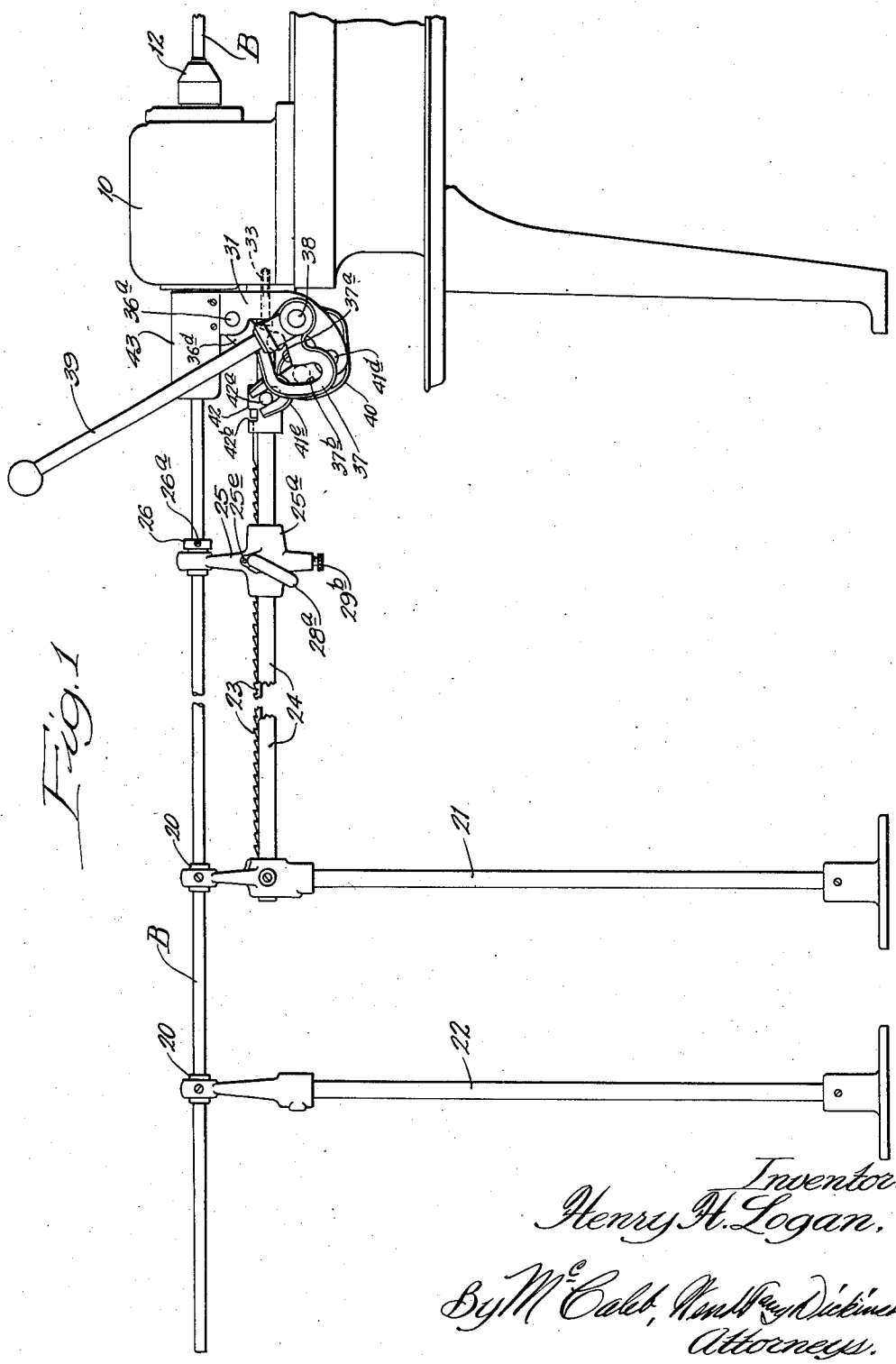

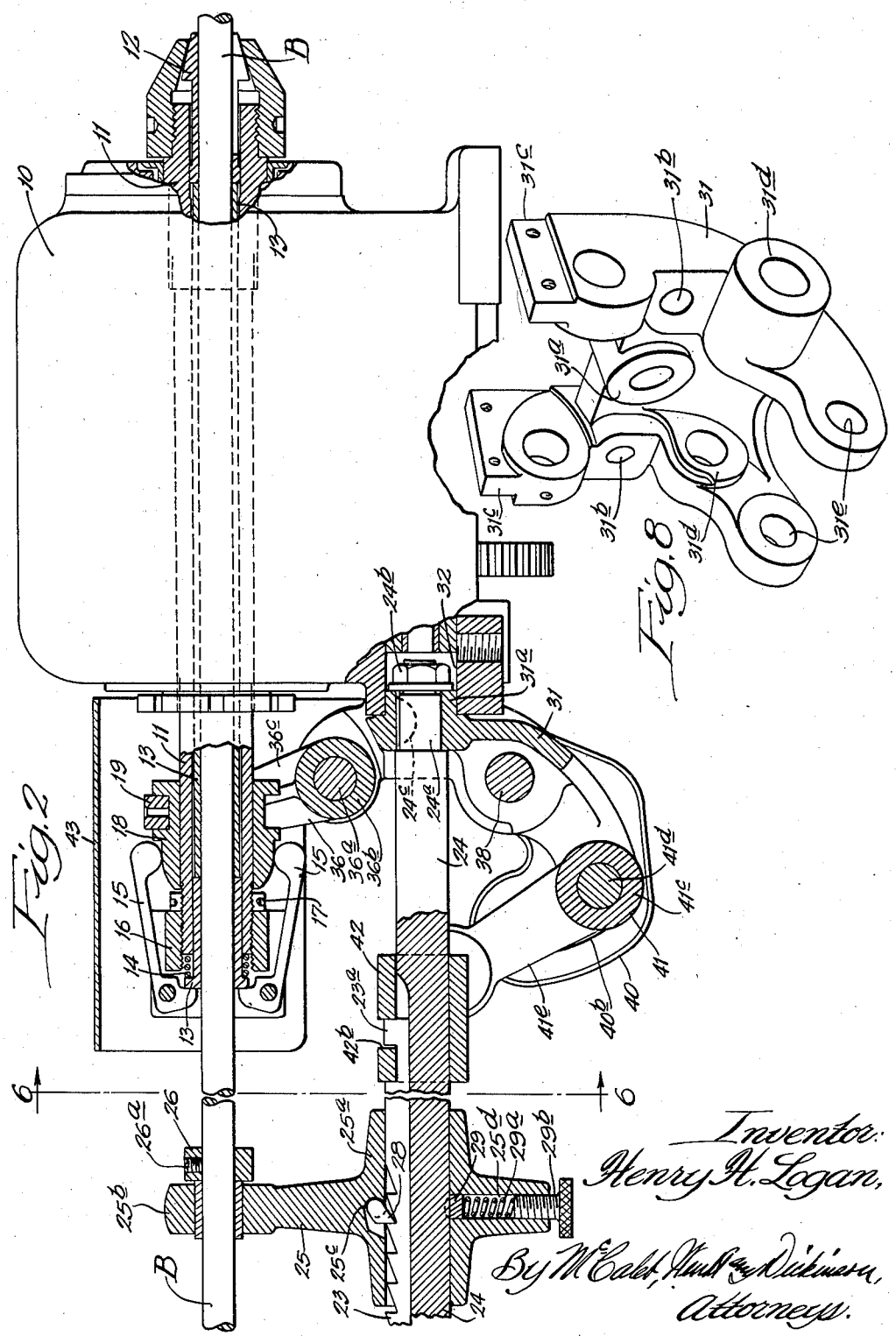

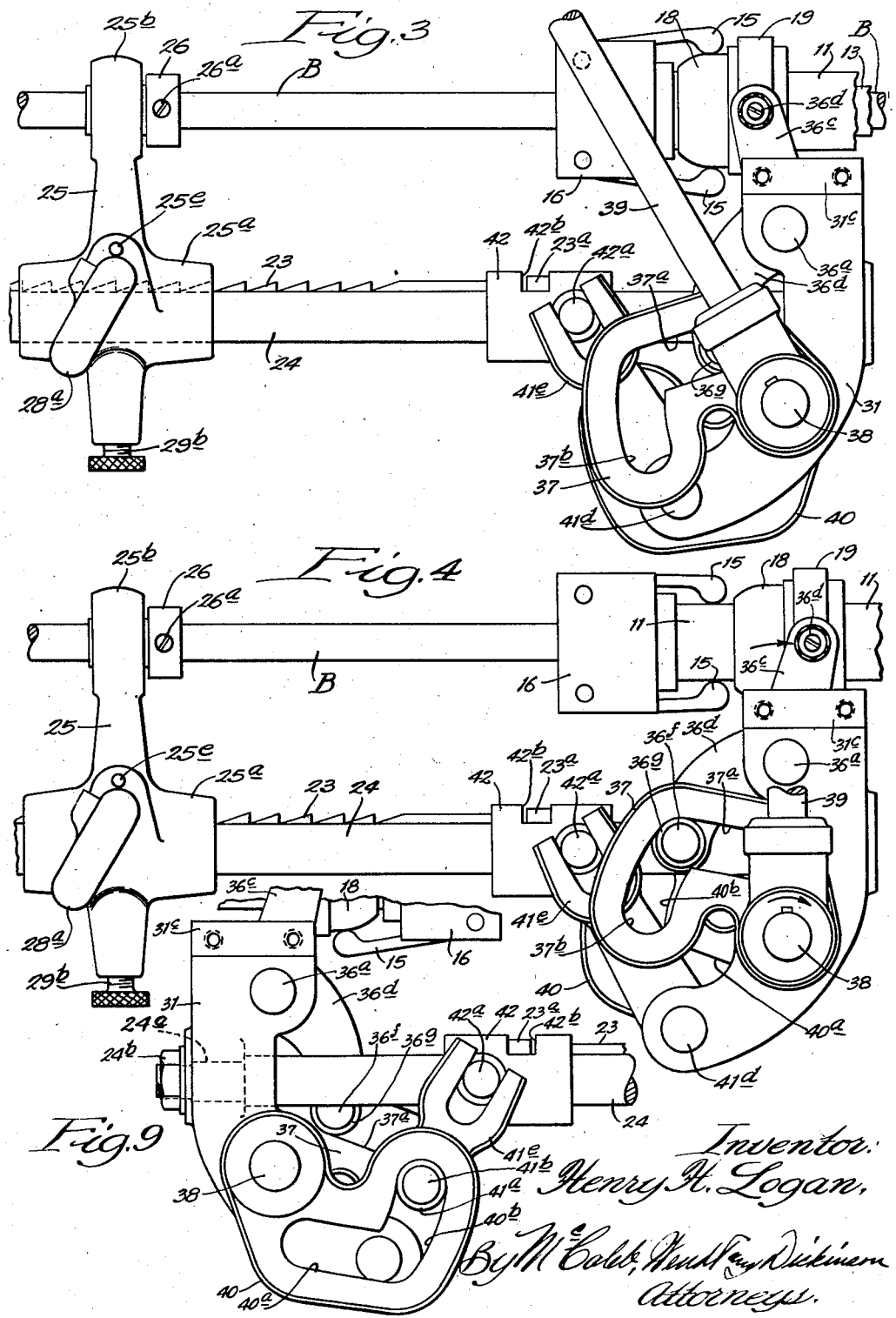

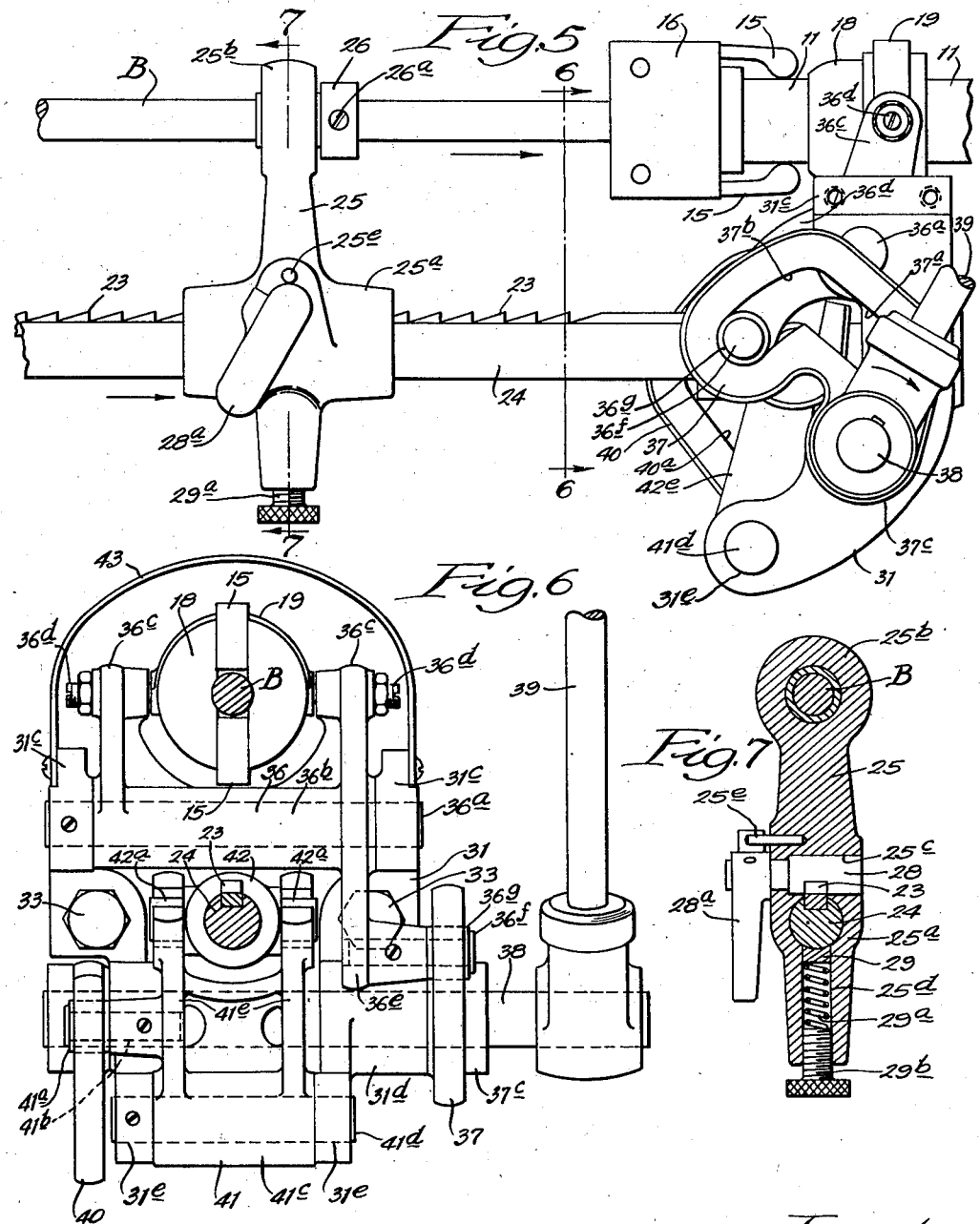

2,376,606

UNITED STATES PATENT OFFICE 2,376,606

BAR FEED FOR LATHES

Henry H. Logan, Chicago, Ill., assignor to Logan Engineering Co., Chicago, Ill., a corporation of Illinois Application February 24, 1943, Serial No. 476,883

6 Claims. (Cl. 29—59)

My invention relates to the so-called bar feeds for lathes, especially turret lathes. Such a bar feed advances a bar through the hollow spindle of the lathe to supply successive lengths of bar stock. Since the bars rotate, they must be locked against rotary and axial movement relative to the spindle, which is usually done by a collet in the nose of the spindle which is tightened and released by cam-controlled fingers operating on the tail end of a sleeve slidable within the spindle and about the bar. For convenience, the locking and releasing of the collet is usually incorporated as an incident to the operation of the bar feed proper, whereby the steps of releasing the collet, advancing the bar, tightening the collet, and retracting the feed mechanism preparatory to the next advance, is all done within the cycle of a single operating lever.

One objection to such bar feeds has been that the sliding sleeve which controls the collet-operating fingers has had to slide along the spindle not only the distance required for tightening or releasing the collet, but also, additionally, the distance equivalent to the distance the bar stock is shifted at each feed. If the lathe were to be used only for making relatively short parts from the bar stock, so that the feed distance would be short, this added movement of the sleeve would not be so objectionable. But since the work often involves a considerable feed distance and the bar feed mechanism of the lathe must therefore be built to accommodate it, there has followed the serious objection that the lathe spindle and the collet-shifting tube have had to be built with considerable extra length to accommodate the feed movement. These objections have included the necessity of an extra long lathe spindle, the added steel required for it, the greater production difficulties occasioned by the longer bore which must be true, extra space, the long overhang beyond the headstock bar, and the consequent tendency to instability and vibration.

A major object of my invention is to provide a bar feed mechanism, incorporating the locking and releasing of the collet, wherein the cam sleeve for releasing the collet fingers and other axially shifted parts incident to the collet control, need shift axially of the spindle only so far as the collet locking and releasing itself requires, to the exclusion of any added shifting distance required for the bar feed itself. Thereby the application of my bar feed mechanism and collet control to a lathe involves but a minimum extra spindle length.

Another feature of my invention is that my mechanism which reciprocates the collet-controlling sleeve and which reciprocates the bar feed ratchet is unusually compact, forms a small unit readily attached to the end of the headstock, and presents its single controlling lever in a position most convenient to the operator.

The foregoing, together with further objects, features, and advantages of my invention, are set forth in the following description of a specific embodiment thereof as illustrated in the accompanying drawings wherein:

Fig. 1 is a side elevation of the headstock of a lathe showing my bar feed mechanism and the supports for the bar stock;

Fig. 2 is a detail thereof partly in vertical longitudinal section;

Fig. 3 is a side elevation of the bar feed mechanism of Fig. 2 with the parts in the same position as Fig. 2, that is, with the collet locked;

Fig. 4 is a side elevation like Fig. 3 except that the mechanism has been advanced to an intermediate point where the release of the collet has been accomplished but the bar has not been fed;

Fig. 5 is a side elevation like Figs. 3 and 4 except that the mechanism has been advanced to its farthest position to effect the bar feed;

Fig. 6 is a transverse vertical section looking toward the headstock of the lathe taken on the line 6—6 of Figs. 2 and 3;

Fig. 7 is a transverse vertical section through the bar feed carrier taken on the line 7—7 of Fig. 5;

Fig. 8 (Sheet 2) is a perspective view of the frame member of the shifting mechanism; and Fig. 9 (Sheet 3) is a back side elevation of the shifting mechanism in the lower righthand corner of Fig. 3.

The headstock 10 of the lathe journals a spindle 11 which at its nose carries a collet 12. A collet-controlling tube 13 runs back through the spindle 11 and about the bar B. A spring 14, interposed between the end of the spindle 11 and a collar at the end of the tube 13, urges the tube backwardly tending to release the collet.

Diametrically opposed fingers 15 are pivoted on a head 16 threaded onto the end of the spindle and fixed by a lock nut 17. The inwardly offset ends of the fingers abut the end of the tube 13 whereby a radial spreading of the free ends of the fingers will push the tube forwardly against the resilience of the spring 14 to lock the collet upon the bar B. Spreading of the fingers 15 and their return movement under the urging of the spring 14 is controlled by the rounded end of the cam sleeve 18 slidably mounted on the spindle and shifted by a yoke 19. I shall subsequently describe the mechanism whereby the yoke 19 is rocked to effect the locking and releasing of the collet.

A long length of the bar stock B is rotatably supported in bushings 20 in the upper ends of near and far standards 21 and 22. A long ratchet bar 23 is slidably mounted splinewise in a longitudinal groove along the upper side of a guide rod 24. The far end of the guide rod is fixed in the near standard 21; its near end is supported in the headstock as shown in Fig. 2.

A bar feed carrier 25 has a lower hub 25a whereby it is slidably mounted upon the guide rod 24. It has a bushed upper eye 25b through which the bar B extends. The hub 25a also receives and passes the ratchet bar 23. A cross bore 25c (see Fig. 7 also) just above the guide rod and ratchet bar journals a pawl 28 which, by virtue of the weight of its obliquely mounted handle 28a, tends to swing down into engagement with the teeth of the ratchet bar 23. The pawl can be disengaged by lifting the handle 28a as limited by a stop pin 25e on the carrier.

A stop collar 26 fixed upon the bar B by a set screw 26a is adapted to abut the eyed upper end of the carrier 25 whereby to shift the bar longitudinally into the spindle when the carrier is shifted by the shifting of the ratchet bar in that direction.

The carrier 25 is frictionally locked to the guide rod 24 with the aid of a plug brake 29 working in the downwardly opening vertical bore 25d of the carrier, which plug brake is urged against the bottom of the guide rod by a spring 29a adjustably compressed by a screw plug 29b.

Thus a latheward pull on the ratchet bar 23 will engage the pawl 28 and thereby shift the carrier 25 which, abutting the collar 26, will shift the bar B into the lathe. On the other hand, shifting of the ratchet bar 23 in the opposite direction—away from the lathe—will not shift the carrier because the carrier is frictionally locked to the guide rod 24 and the ratchet bar, on retrogression, will ratchet past the pawl 28.

I shall now describe the mechanism for shifting the cam sleeve 18 to effect the locking and unlocking of the collet and for reciprocating the ratchet bar 23 to effect the bar feed, taking up the former first.

This shifting mechanism is mounted on a frame 31, the shape of which is best seen from Fig. 8. It is detachably fixed upon the headstock of the lathe by a boss 31a which fits into a bearing bore 32 in the headstock, and by a pair of cap screws 33 passing through laterally spaced holes 31b in the frame and entering tapped holes in the end of the headstock provided for the purpose of attaching accessories. The reduced inner end 24a of the guide rod 24 passes through the boss 31a and receives the nut 24b, whereby the guide rod 24, at its inner end, is fixed to, and supported by, the frame 31.

The laterally spaced upper wings 31c of the frame 31 mount the bearing pin 36a of a collet-shifting rocker 36, the bearing pin passing through the bore of a hub 36b of the rocker.

Thereby the rocker 36 is journaled upon the frame to rock about a transverse horizontal axis. The laterally spaced upper arms 36c of the rocker 36 carry adjustable, inwardly extending, yoke-bearing pins 36d whereby diametrically to pivot the previously-mentioned shifter yoke 19 which rides in an annular groove in the cam sleeve 18. Thereby rocking of the rocker 36 will shift the cam sleeve 18 to effect locking and releasing of the collet through the fingers 15 and the tube 13. Rocking of the collet-shifting rocker 36 is effected by means of an arm 36d depending at the front side thereof and carrying a horizontally outstanding stud pin 36f bearing a roller 36g.

The roller 36g of the collet-shifting rocker 36 rides in the slot of a collet-shifting cam 37, the hub 37c of which is fixed upon a cam shaft 38. The cam shaft 38 is transversely and horizontally journaled in bearings 31d in the sides of the frame 31 somewhat below the guide rod 24. On its forward end the cam shaft 38 carries an upstanding hand lever 39.

The slot of the collet-shifting cam 37 in which the roller 36g of the collet-shifting rocker 36 rides, comprises two successive portions—a cam slot 37a and a dwell slot 37b arcuately described about the axis of the shaft 38. These two portions of the slot of the cam 37 are so arranged that as the lever 39 is pulled toward the headstock by the operator from the normal position of Figs. 1, 2 and 3, the roller 36g will first ride in the cam slot 37a with the result that it will be thrown out to a greater radius from the cam shaft 38 and thereby rotate the collet-shifting rocker 36 clockwise to shift the finger cam sleeve 18 toward the headstock, thereby releasing the fingers 15 to permit the spring 14, acting through the tube 13, to release the collet. By the time the lever 39 has been shifted to its intermediate vertical position of Fig. 4 and the roller 36g has reached the end of the cam slot 37a and the beginning of the dwell slot 37b, movement of the collet-shifting rocker 36 will have been terminated and further movement of the handle and the cam 37 will merely hold the rocker 36 in its position of Fig. 4.

I shall now describe that part of the shifting mechanism which effects the bar feeding shift of the ratchet bar 23.

At the back side of the mechanism the back end of the cam shaft 38 carries a bar feed cam 40, the slot of which—in a somewhat similar manner but in reverse order as compared with the collet-shifting cam 37—comprises a cam slot 40a and a dwell slot 40b. In this slot rides a roller 41a borne by a stud pin 41b protruding from the back side of a bar feeding rocker 41. The rocker 41 is journaled on the frame 31 by means of a transverse bearing pin 41d extending through the lower hub 41c of the rocker and fixed at its ends in a pair of laterally spaced lower bearings 31e depending from the frame 31 as best shown in Fig. 6.

At its upper end the bar feeding rocker 41 carries a pair of laterally spaced arms 41e, the upper end of each of which in turn is forked to receive the respective trunnions 42a of a ratchet bar collar 42. The collar 42 is slotted at 42b to receive the head formed at the inner end of the ratchet bar 23. The collar 42 surrounds and is shiftable along the guide rod 24, under the control of the bar feeding rocker 41, which in turn is controlled by the bar feed cam 40 fixed to the same shaft as the lever 39. The cam slot 40a and the dwell slot 40b in the bar feed cam 40 are so disposed and arranged that when the lever 39 is pulled from its normal position of Figs. 1, 2 and 3 to its intermediate position of Fig. 4 to effect release of the collet, the bar feeding rocker 41 is not rocked and consequently there is no feeding movement imparted to the bar. This is in order, because the bar should not be subjected to feed until the collet which locks it has been released.

Continued forward pull of the lever 39 beyond its intermediate vertical position of Fig. 4 brings the roller 41a of the bar feeding rocker 41 out of the dwell slot 40b of the bar feed mechanism 40 and into the cam slot whereupon the bar feeding rocker 41 is swung to shift its forked arms 41e toward the headstock and hence, by means of the ratchet bar collar 42, to draw the ratchet bar 23 toward the headstock because the pawl 28 then engages the teeth of the ratchet bar 23. The carrier 25 is likewise shifted, pressing against the stop collar 26 to effect the desired feed of the bar B as limited by the stop usually provided on the turret or on the tail stock.

It will be understood that by modifying the disposition of the cam slot 40a of the bar feed cam 40 or lengthening it, a greater range of feed may be accommodated without affecting the desirable confinement of movement of the cam sleeve 18 to that travel which is necessary to effect the locking and releasing of the collet.

Upon reverse movement of the lever 39 toward its normal position, the ratchet bar will first be retrogressed, ratcheting past the pawl without moving the carrier 25, and then after the lever has passed its intermediate vertical position of Fig. 4, effecting the re-locking of the collet upon the bar B.

As a result of successive feeds of the bar B, the carrier 25 will be progressed up toward the headstock to a position where, save for the interruption in the ratchet bar teeth, the carrier would abut the collar 42. When that progression of the carrier is reached, the operator lifts the handle of the pawl to disengage it from the ratchet bar teeth, slides the carrier back to the standard 21, drops the pawl, and resets the stop collar 26 to abut the carrier in its new position. This resetting is repeated from time to time until the length of the bar B is exhausted. An arched cover or shield 43 is set over the cam sleeve 18, fingers 15 and head 16 and serves also as a partial protection for the shifting mechanism mounted on the frame 31. The cover may be mounted by screws which clamp its lower edge to the upper wings 31c of the frame.

From Fig. 2 it will be apparent how relatively compact the collet-releasing mechanism may be made and how relatively short a protruding overhang of the spindle is required by my invention where the reciprocating movement given the cam sleeve 18 is only that required for its function of locking and releasing the collet.

The frame 31 and the mechanism mounted on it for effecting the collet releasing and bar feed shifting is also very compact and yet presents the hand lever 39 in a convenient position.

While I have illustrated and described this specific embodiment of my invention, I contemplate that many changes and substitutions may be made without departing from the scope or spirit of my invention.

I claim:

1. For a lathe headstock having a hollow spindle with a forward collet and a rearward collet-operating cam sleeve and having associated therewith a bar feed including a ratchet bar, shifting mechanism for the sleeve and for the ratchet bar comprising a frame for attachment to the headstock rearwardly thereof, a transverse horizontal cam shaft journaled in the frame, an upstanding hand lever on the shaft, a sleeve-operating cam on the shaft having a camming reach and a dwell reach, a shifter controlled by the cam for shifting the sleeve, a ratchet bar-operating cam on the shaft having a camming reach and a dwell reach, and a shifter controlled by the latter cam for progressing the ratchet bar, the shifting mechanism being so constructed and arranged that the camming reach of each cam is effective upon its shifter while the dwell reach of the other cam is effective upon its shifter, whereby the ratchet bar and the cam sleeve are shifted sequentially.

2. In a bar feed and locking device for a hollow-spindled lathe comprising a collet at the front end of the spindle, a collet-controlling tube extending through the spindle, fingers on the rear end of the spindle for shifting the tube, a cam-sliding sleeve for controlling the fingers and in turn the locking and release of the collet, a rearwardly extending guide rod, a ratchet slidably therealong, and a feed carriage slidable along the guide rod with pawled engagement with the ratchet bar and adapted to engage a stop on a stock bar extending rearwardly through the spindle, mechanism for successively shifting the cam sleeve and ratchet bar comprising a rocker connected to the ratchet bar for shifting it, a rocker connected to the cam sleeve for shifting it, a cam shaft having an operating lever, cooperating cam means on the shaft and on the respective rockers including successively positioned camming reaches and dwell reaches constructed and arranged, upon rotation of the shaft in one direction, first to shift the sleeve releasing the collet without effective shifting of the ratchet bar and then to shift the bar without substantially shifting the sleeve, and, upon return rotation of the shaft, to shift the sleeve for locking the collet and to retrogress the ratchet bar.

3. A collet control and bar feed shifting mechanism constituting a unitary device for attachment to a lathe having a ratchet bar feed and a collet-controlling sleeve, and comprising a frame to be mounted on the end of the headstock beneath the protruding spindle, a collet rocker transversely pivoted on the frame having an upstanding yoke for shifting engagement with a collet-controlling cam sleeve on the spindle, a feed rocker transversely pivoted on the frame having a yoke for shifting engagement with a longitudinally slidable ratchet bar of the bar feed, a horizontal cam shaft transversely journaled on the frame, a hand lever on the shaft, and cooperating cam elements on each rocker and on the shaft respectively, including sequentially arranged camming and dwell reaches, which, upon swinging the lever in one direction, first rock the collet rocker for shifting the sleeve to collet-releasing position and then, without further substantial shift of the sleeve, rock the feed rocker to shift the ratchet bar for progressing the bar stock, and, upon return swinging of the lever, rock the collet rocker to shift the sleeve to collet-locking position and rock the feed rocker to retrogress the ratchet bar.

4. A collet control and bar feed shifting mechanism attachment for a lathe having a ratchet bar feed, comprising a supporting frame adapted to be mounted on the headstock of a lathe, said frame being provided with an actuating shaft rotatably mounted thereon, an actuating handle carried by said shaft, a pair of cam members carried by said shaft and having their active driving portions located to be effective at different angular positions of said handle, one of said cams being a collet controlling cam and the other of said cams being a feed controlling cam, a feed controlling lever pivotally mounted on said frame and having one of its ends adapted to actuate the ratchet bar feed and the other of its ends provided with means for engaging the feed controlling cam, a collet controlling lever mounted on said frame and having one of its ends provided with means for actuating the collet controlling sleeve, and the other of its ends provided with means for engaging the collet controlling cam, whereby the actuation of the handle is adapted to release the collet first and then effect a predetermined feed of the ratchet bar feed upon movement in one direction, and upon movement in the other direction the said handle is adapted to return the ratchet bar for a new feed first and thereafter to close the collet.

5. A collet control and bar feed shifting mechanism attachment for a lathe having a ratchet bar feed, comprising a supporting frame adapted to be mounted on the headstock of a lathe, said frame being provided with an actuating shaft rotatably mounted thereon, an actuating handle carried by said shaft, a pair of cam members carried by said shaft and having their active driving portions located to be effective at different angular positions of said handle, one of said cams being a collet controlling cam and the other of said cams being a feed controling cam, a feed controlling lever pivotally mounted on said frame and having one of its ends adapted to actuate the ratchet bar feed and the other of its ends provided with means for engaging the feed controlling cam, a collet controlling lever mounted on said frame and having one of its ends provided with means for actuating the collet controlling sleeve, and the other of its ends provided with means for engaging the collet controlling cam, whereby the actuation of the handle is adapted to release the collet first and then effect a predetermined feed of the ratchet bar feed upon movement in one direction, and upon movement in the other direction the said handle is adapted to return the ratchet bar for a new feed first and thereafter to close the collet, the said cams comprising a pair of members having the active camming portion formed as the wall of a slot for engaging complementary members carried by the cooperating levers.

6. A collet control and bar feed shifting mechanism attachment for a lathe having a ratchet bar feed, comprising a supporting frame adapted to be mounted on the headstock of a lathe, said frame being provided with an actuating shaft rotatably mounted thereon, an actuating handle carried by said shaft, a pair of cam members carried by said shaft and having their active driving portions located to be effective at different angular positions of said handle, one of said cams being a collet controlling cam and the other of said cams being a feed controlling cam, a feed controlling lever pivotally mounted on said frame and having one of its ends adapted to actuate the ratchet bar feed and the other of its ends provided with means for engaging the feed controlling cam, a collet controlling lever mounted on said frame and having one of its ends provided with means for actuating the collet controlling sleeve, and the other of its ends provided with means for engaging the collet controlling cam, whereby the actuation of the handle is adapted to release the collet first and then effect a predetermined feed of the ratchet bar feed upon movement in one direction, and upon movement in the other direction the said handle is adapted to return the ratchet bar for a new feed first and thereafter to close the collet, the said cams comprising a pair of members having the active camming portion formed as the wall of a slot for engaging complementary members carried by the cooperating levers, and the said slots being formed with dwelling portions for engaging the parts on said levers where movement of the cam is to be ineffective.

HENRY H. LOGAN.